US006537177B2

(12) United States Patent
Degroot et al.

(10) Patent No.: US 6,537,177 B2
(45) Date of Patent: Mar. 25, 2003

(54) OVERSPEED PREVENTION

(75) Inventors: Jeffrey L. Degroot, Metamora, IL (US); H. Paul Dietz, Naperville, IL (US); Susan J. Gaugush, Peoria, IL (US); Thomas G. Skinner, Aurora, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 09/742,756

(22) Filed: Dec. 20, 2000

(65) Prior Publication Data

US 2002/0115531 A1 Aug. 22, 2002

(51) Int. Cl.$^7$ ................................................ B60K 41/02
(52) U.S. Cl. ......................................... 477/75; 192/220
(58) Field of Search ............................. 477/75; 192/220

(56) References Cited

U.S. PATENT DOCUMENTS

| | | |
|---|---|---|
| 3,927,579 A | 12/1975 | Golan |
| 3,981,618 A | 9/1976 | Nelson, Jr. |
| 4,155,277 A | 5/1979 | Minami et al. |
| 4,185,521 A | 1/1980 | Beals |
| 4,258,591 A | 3/1981 | Eckert et al. |
| 4,364,230 A | 12/1982 | Holmes |
| 4,365,473 A | 12/1982 | Schexnayder et al. |
| 4,463,842 A | 8/1984 | Redzinski |
| 4,597,465 A | 7/1986 | Burney |
| 4,732,055 A * | 3/1988 | Tateno et al. |
| 5,361,207 A | 11/1994 | Hayafune |
| 5,416,698 A | 5/1995 | Hutchison |
| 5,545,108 A | 8/1996 | Wagner et al. |
| 5,587,905 A | 12/1996 | Yesel et al. |
| 5,685,801 A | 11/1997 | Benford et al. |
| 5,778,331 A | 7/1998 | Leising et al. |
| 5,779,585 A | 7/1998 | Tsukamoto et al. |
| 5,819,585 A | 10/1998 | Darnell |
| 5,882,277 A | 3/1999 | Iizuka |
| 5,931,885 A | 8/1999 | Kubo et al. |
| 6,055,474 A | 4/2000 | Adachi et al. |

* cited by examiner

Primary Examiner—Dirk Wright
(74) Attorney, Agent, or Firm—Nexsen Pruet Jacobs & Pollard, LLP; Liza J Meyers

(57) ABSTRACT

A method to prevent overspeed of an internal combustion and attached ancillary devices in a mechanized vehicle includes one or more procedures to prevent improper gear selection to disengage the lockup function of a torque converter, to initiate engine braking and to destroke variable displacement hydraulic pumps. Requested gear selection in downshift is allowed only after interrogation of brake pressure, ground speed, shift selection requested and torque converter output speed. The torque converter lock-up solenoid is activated or deactivated in response to torque converter output speed which is compared to selected values to engage or disengage. Engine braking using a compression release braking system response to engine RPM in manual or automatic mode to prevent overspeed. Variable displacement pumps are destroked in response to engine RPM by adjusting swashplate control.

The systems may be operated independently or under the control of a common electronic module.

21 Claims, 4 Drawing Sheets

OVERSPEED PREVENTION

TECHNICAL FIELD

This invention relates generally to control methods to prevent engine, transmission and ancillary device overspeed in vehicles having an internal combustion engine mechanically connected to the wheels or tracks of the vehicle and more particularly to sequences of steps initiated automatically by electronic control modules to prohibit damage due to operator error or component failure.

BACKGROUND ART

Modern heavy duty trucks and heavy duty off-road mining and construction equipment have engines and drivetrains which are susceptible to extensive and expensive damage when operated in excess of about 2500 to 3000 RPM (crankshaft revolutions per minute), depending upon design. High-pressure hydraulic pumps, especially variable output pumps, are similarly speed limited. The advent of electronic engine controls allows engine RPM to be controlled by interrupting ignition pulses in Otto cycle engine and by limiting fuel flow in Diesel cycle engines. Neither approach prevents overspeed when a vehicle is in a gear and the weight of the load creates momentum sufficient to backload through the transmission and force the engine speed above the critical limit.

U.S. Pat. No. 5,587,905 to Yesel et al., granted Dec. 24, 1996, discloses a system for preventing overspeed in heavy equipment having an electronically controlled transmission and engine by disallowing downshifting the transmission to the desired gear as engine and transmission speeds allow. A microprocessor-based electronic module serves as a controller which compares various input signals to stored benchmarks and responds in a predetermined pattern.

U.S. Pat. No. 5,416,698 to Hutchison, granted May 16, 1995, is directed to a warning system to advise a vehicle operator that a gear has been selected which will cause overspeeding or underspeeding of the engine when the clutch is re-engaged.

U.S. Pat. No. 4,463,842 to Redzinski, granted Aug. 7, 1984, discloses an automatic lockup of a torque converter in the driveline of a work vehicle responsive to the speed of the output shaft of a torque converter.

U.S. Pat. No. 5,615,653 to Faletti et al., granted Apr. 1, 1997, is representative of compression release engine braking technology frequently employed on Diesel engines for freight hauling.

The prior art addresses individual aspects for avoiding gear selection errors and smoothing techniques for cruise control systems. None of the prior art is directed to unified systems to protect engines, pumps and ancillaries from overspeed when a combination of weight, slope and mechanical coupling of engine and drivetrain produce a potentially damaging overspeed through backloading.

The present invention is directed to overcoming one or more of the problems or disadvantages associated with the prior art.

DISCLOSURE OF THE INVENTION

The invention is directed to systems for the protection of components of a heavy vehicle from damage due to overspeed of the engine and engine driven components.

In a first aspect of the invention, a system is provided to override the operator's manual control of the gear selection in a transmission having electronic shifting control. In a second aspect of the invention, there is provided a system to disengage a lockup clutch of a torque converter when a potential overspeed condition is identified in an output from the transmission.

In another aspect of the invention, there is provided a system to slow and optionally retard an engine approaching an overspeed condition by overriding an operator-selected engine speed control and by optionally phasing in a compression release engine braking system.

In a further aspect of the invention, a system is provided to destroke variable capacity hydraulic pumps associated with the engine in response to the same signals provoking a system for the override of the operator-selected engine speed.

In yet another aspect of the invention, the control functions for transmission control, torque converter control, engine control and pump destroking are controlled by a microprocessor which also transmits visual/or and auditory messages to the operator, records operating events and allows operator override in the event of the failure of other systems on the vehicle.

BEST MODE FOR CARRYING OUT THE INVENTION

The invention is applicable to any vehicle having a mechanical connection between an engine and driven wheels or tracks. In the preferred embodiment, the engine is a Diesel engine and the transmission is a planetary transmission connected to the engine through a torque converter having a lock-up clutch. Exemplary vehicles for the application of this invention are track loaders, wheel loaders, integrated tool carriers, wheel dozers, backhoe loaders, excavators, trucks, tractor-scrapers and any other configuration of a vehicle capable of carrying a load. The invention is particularly adapted to vehicles having hydraulic implement controls and other power take-off devices which are RPM restricted.

Diesel engines for heavy truck and off-road implement applications are high torque, usually turbocharged direct injection motors which are operated within a narrow RPM range. For construction and other off-road use, it is preferred to operate at a preset RPM corresponding to maximum fuel economy. The speed is set using a "throttle", the position of which is read by sensors in the cab. The speed is regulated by electronically controlling the fuel flow rate.

A compression release engine braking system (CRBS) is a method for maximimzing the engine retardation by converting the engine into an air compressor. Numerous systems are available and all are based on fuel shut-off followed by overriding the exhaust valves to cause exhaust valves to open as a piston approaches top dead center on the compression stroke. The manner of actuation is not critical to this invention although a variable system as disclosed in U.S.

Pat. No. 5,615,653 may be preferred to the more conventional systems which are "all or nothing" in operation. Conventional engagement of the CRBS is by a manual switch. In accordance with this invention, the CRBS also may be automatically triggered or phased in response to a sensed crankshaft rotation speed. Likewise, the CRBS is deactivated either manually or in response to a lower RPM set point. Upon deactivation of the CRBS, the engine speed is resumed at a pre-set value such as low idle or the control is resumed by the operator.

The transmission may be of any type including straight cut, bevel cut, counter shaft or lay shaft and planetary transmissions and either clutch coupled using sliding clutch collars or crash. In consideration of the torque throughout requirements and the need for smooth gear change transitions, an electronically controlled planetary transmissions with perimeter-mounted clutch packs is preferred.

Figure 1:
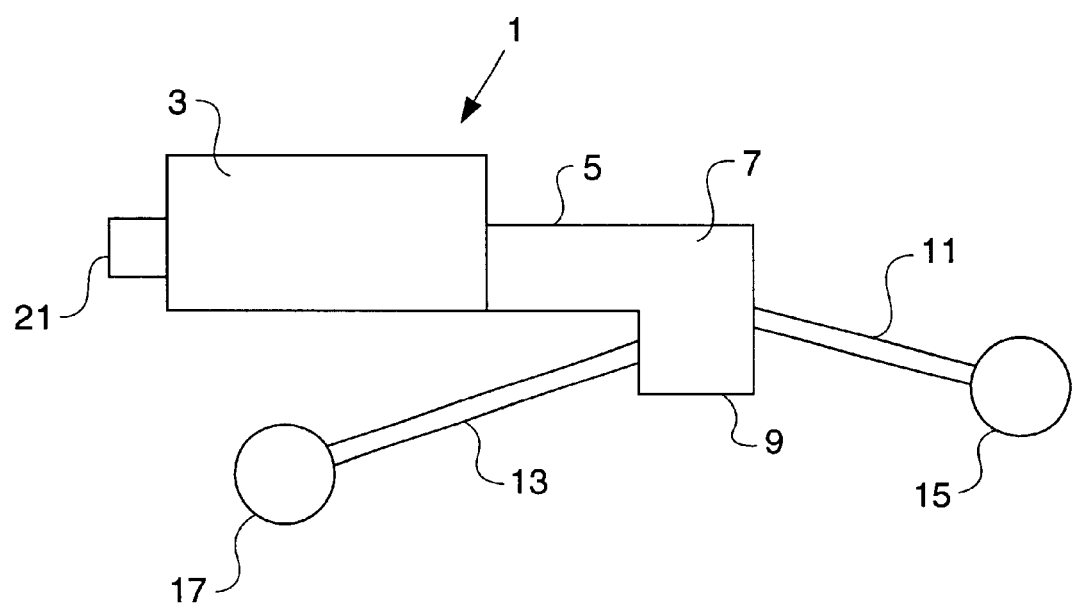
FIG. 1 shows the location of basic components of an off-road work vehicle according to an embodiment of the present invention.

FIG. 1 shows the arrangement of components in a typical configuration for a wheel loader. The drivetrain 1 consists of an engine 3, a clutch 5 in the form of a torque converter connecting the drive from the engine 3 to transmission 7. The output from transmission 7 is through a power take off 9 from which propeller shafts 11, 13 transmit power to axles 15, 17. The configuration of power take off 9, propellor shafts 11, 13 and axles 15, 17 may vary with the application and are not critical to the invention. One or more pumps 21 are driven from engine 3 to provide the hydraulic pressure for operation of various system such as steering, lifting, braking, fan drives, etc.

The engine 3 may be a two or four stroke Diesel engine. The number of cylinders and displacement are not critical except as they impose limitations on maximum safe operational RPM. Commercial diesel engines are normally turbocharged, directly injected, and have a pushrod-driven valve train, the latter typically being the determining factor in qualifying the upper limit of engine operating speed. For purposes of this description, the term "overspeed" will be used to describe an engine operating condition at which damage to the engine is likely to occur. What constitutes engine overspeed depends upon the particular engine specification, but for engines of this type is usually between 2500 and 3000 RPM. "Overspeed" also applies to pumps and any other ancillaries caused by high engine RPM. Overspeed of engine driven ancillaries may be different from that of the engine.

The torque converter 5 preferably is an impeller clutch type characterized by having an electronically activated lockup to eliminate slippage above a specified RPM or when other throughput values have been achieved. Lockup clutches successfully overcome the inherent inefficiency of a torque converter by eliminating slippage between engine and driven axles so that the drivetrain functions analogously to one with a conventional friction clutch. In doing so, it also allows the axle to rotate the engine without slippage when the transmission is in gear and when the axles are being rotated by tires or tracks. Such "back propagation" or backloading" may cause overspeeding of the engine is certain circumstances.

The power take-off 9 and downstream drive train units such as propeller shafts 11, 13 and axles 15, 17 are not critical to this invention except that they are conventional and do not include free-wheel ratchets, viscous couplings or other energy transfer limiting devices.

Figure 2:
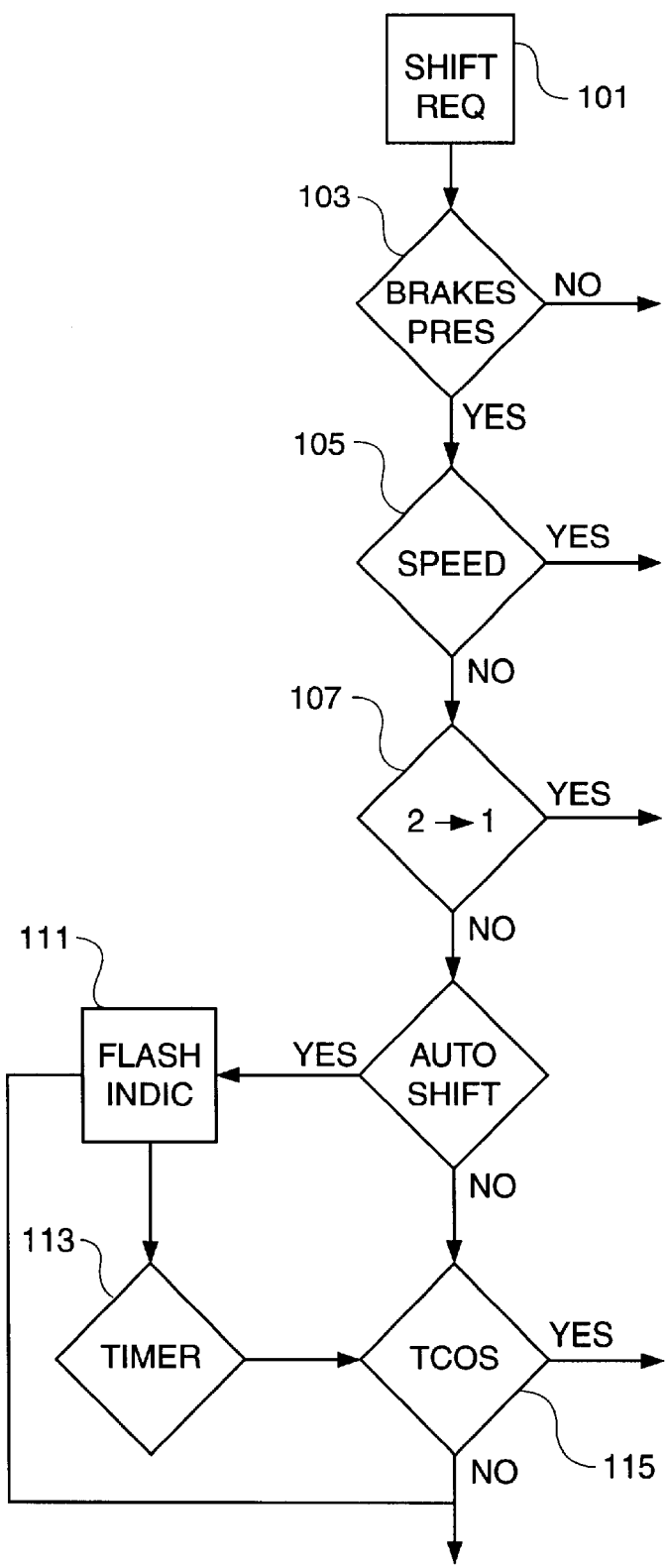
FIG. 2 is a schematic of a transmission control system according to an embodiment of the present invention.

Downshifts by the operator may be intentional or inadvertent (picked wrong gear). In either eventuality, when the gear change is completed, the vehicle speed may cause the engine to overspeed. To prevent such an occurrence, a logic sequence as shown in FIG. 2 is programmed into the shift control circuitry of an electronic shift control module to avoid inappropriate gear changes.

When a shift request 101 is made for a lower gear, the request is temporarily disallowed until a series of checks can be made. Firstly, the hydraulic pressure 103 in the brake system is interrogated. If the pressure is below a preselected value, a real or potential runaway condition exists and the downshift request is honored. If brake pressure is adequate, then groundspeed 105 is interrogated. If the groundspeed is greater than a preselected value, usually 2–3 kph, the request is temporarily disallowed and the request passed to another decision point. If the groundspeed is below the preselected value, the vehicle itself is functionally stopped and any gear selection is allowed. Otherwise, the request is denied and passed to the next decision point.

If the vehicle is not stopped, the specific change requested is interrogated at 107. Specific requests may be allowed. For example, a change to the lowest (highest numerical) gear from the next lowest gear normally would be allowed. Other requests would be temporarily disallowed.

The final discriminator is the torque converter output speed (TCOS). In normal mode, the TCOS is a good approximation of engine RPM. In a lockup mode, it is the engine RPM. When a shift request has been made, the electronic control module 115 can compare the actual TCOS with the TCOS in the requested gear. The comparison may be made using lock-up tables or simple algorithms. When the TCOS in the requested gear would exceed a predetermined value, the shift request is denied.

Autoshift™ is a proprietary Caterpillar™ system which controls the gear range selected by the transmission band on the TCOS. When Autoshift™ is activated, an additional loop is inserted between the gear change analysis at 107 and the RPM comparison at module 115. If the downshift at 107 has been denied and Autoshift 109 is engaged, a flashing gear indicator is displayed in the cab advising the operator that a change has been requested. Then the TCOS analysis 115 is performed.

The scenario described above will prevent damage to the engine and engine driven components as a result of overspeed when the cause is improper gear selection by the operator or misadjustment of the gear selection control system. Gear selection control cannot protect against the overspeed when the gear was properly selected but the vehicle is in a "runaway" situation such as descending a grade. To protect against such "back propagating" of speed of the engine, it is necessary, as a first step, to perform a soft decoupling of drivetrain from engine.

Figure 3:
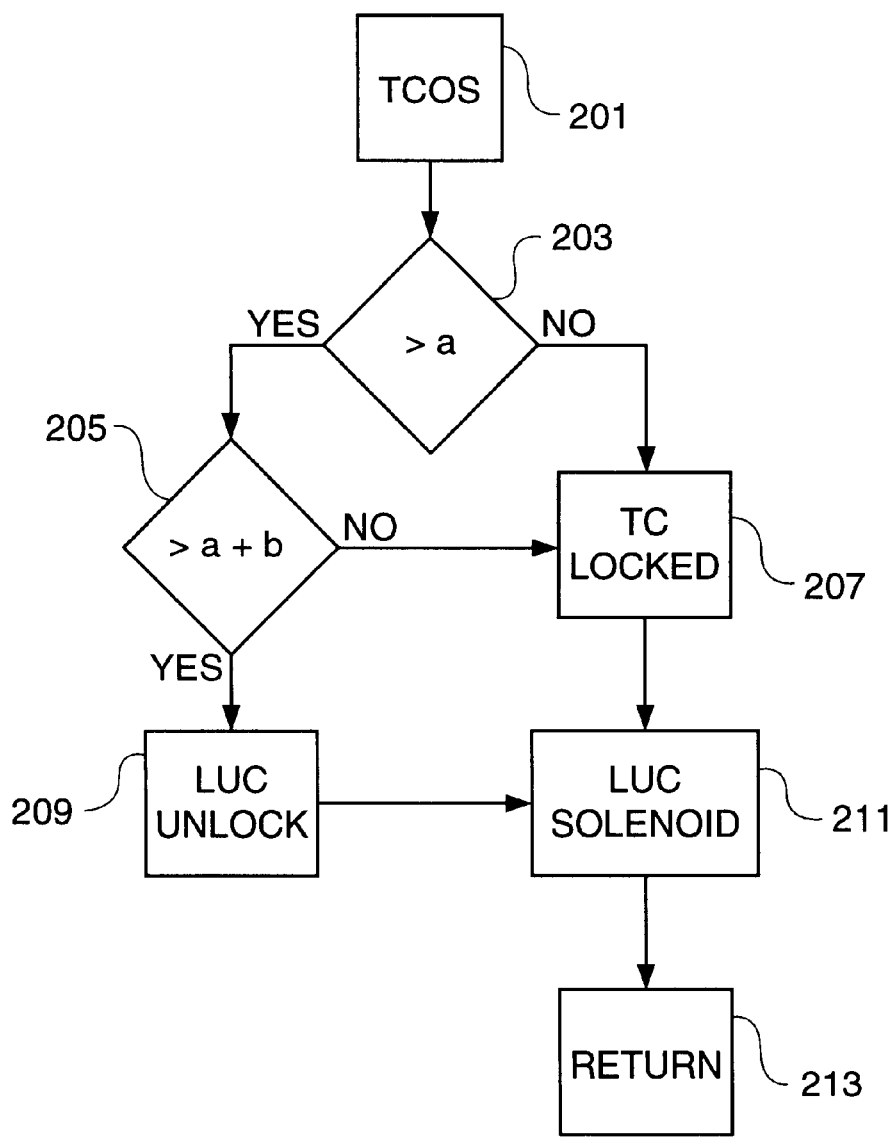
FIG. 3 is a flow chart of a lockup clutch system control according to an embodiment of the present invention.

As shown in FIG. 3, decoupling takes place when torque converter speed is sensed to exceed a preselected value using the criteria described above for denial of a request for a downshift. A torque converter RPM sender 201 sends a signal to a comparator 203. If the signal indicates a torque converter speed below the preset value (a), a signal is sent to a relay 207 through which a signal is sent to the lockup clutch solenoid 211 to take no action (null signal). When the torque converter speed exceeds a preselected value (a), a signal is sent to a second preselected value (a+b). If the value is less than the second preselected value, a signal is sent through relay 207 to the lockup clutch solenoid 211 to take no action (null signal). If the value is greater than the second preselected value, a signal is sent to relay 209 to unlock the clutch. In turn, a signal is sent to the lockup clutch solenoid 211 to disengage the lockup. The cycle is then repeated at return 213.

The slippage through the torque converter is sufficient to prevent overspeed of a transient nature. When the first and/or second preselected value is reached, a suitable combination of warning signals to the operator would be expected to induce the operator to upshift, brake or take other appropriate compensatory action. When the situation becomes a true runaway, additional responses may be required. Since the occurrence of a true runaway would likely entail a major mechanical failure or the incapacitation of the operator, it is desired that the response should be fully automatic.

Figure 4:
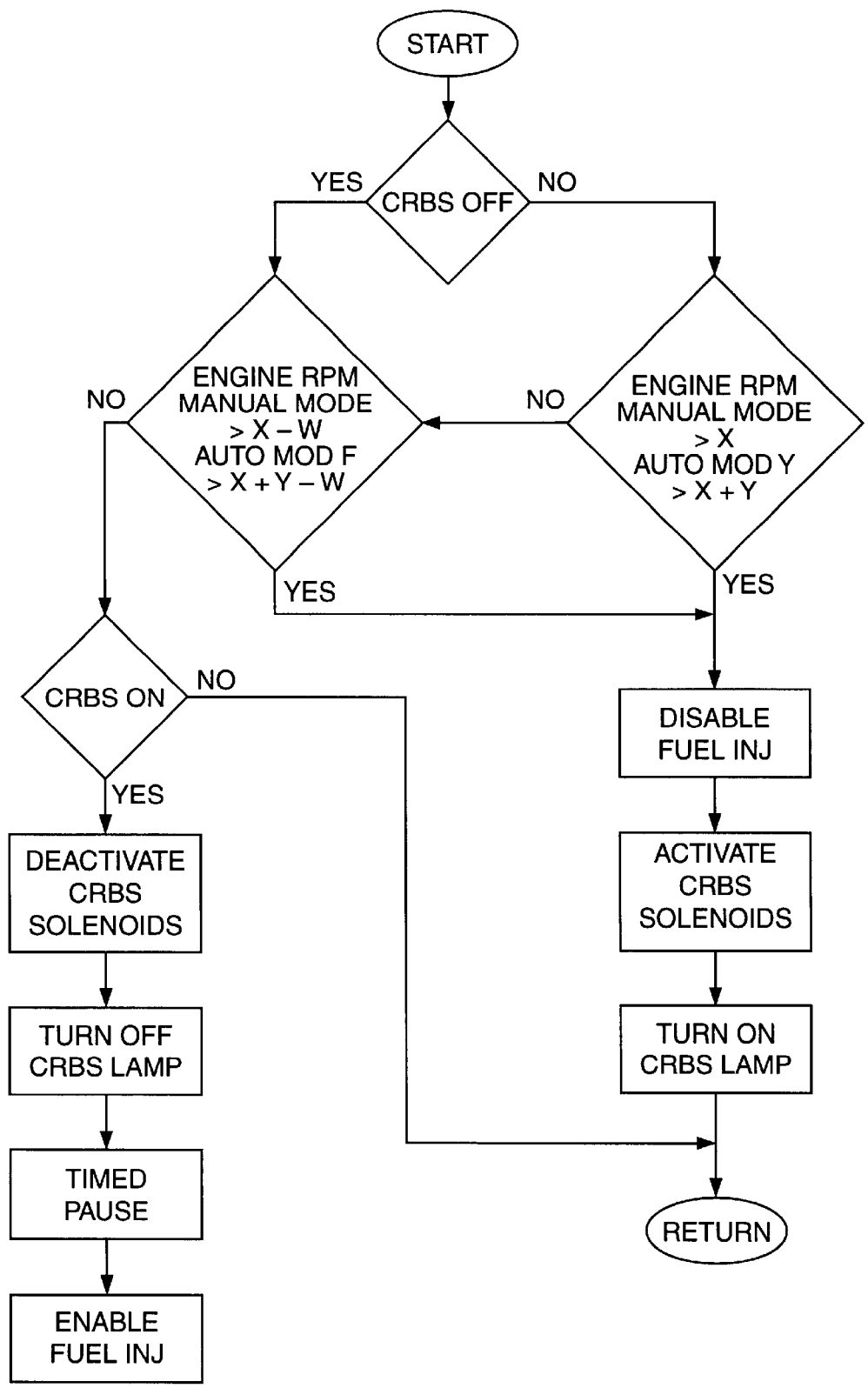
FIG. 4 is a flow chart of an engine control system according to an embodiment of the present invention.

The engine control system of choice is a compression release braking system (CRBS), commonly referred to as a "Jake Brake" after its primary supplier, Jacobs Vehicle Systems Inc™. The operation of the engine control incorporating a CRBS is illustrated in FIG. 4.

A clock 301 times the electronic module which controls the engagement of the CRBS. At regular intervals such as every 60 msec, the routine is commenced. The first step is to interrogate whether the CRBS is on or off 303. If the CRBS is on, an interrogation is made of engine RPM 305. If the engine RPM is greater than a preselected RPM, the remaining CRBS sequence is triggered. If the engine RPM is less than a preselected RPM, a signal is sent to a second comparator 307.

In the preferred embodiment, the CRBS may be used in manual or automatic mode. In manual mode, preselected RPM's would normally be lower because the operator had planned on using CRBS along the transportation route. In automatic mode, the CRBS is acting as a failsafe and the engine rate would be higher. This is indicated in FIG. 4 by lower RPM X and higher RPM X+Y.

The second comparater 307 looks at the RPM signal and determines whether the engine RPM is greater than a second preset value which is lower than the first preset value interrogated at 305. It is at this state where a decision is made to change the step of the CRBS. If the engine RPM exceeds the second preset value, a signal is sent to disable (or continue to disable) the fuel injection 309. The CRBS solenoids 311 are then activated (or remain activated), the CRBS lamp 313 is activated (or remain activated) and the cycle returns to 315 to start.

If the engine RPM as determined at 305 is higher than the preselected values, then the cascade of fuel injection, solenoid and lamps described above is followed.

If the engine RPM as compared at 307 is less than the second preselected values, the on or off status of the CRBS is again interrogated at 317. Of the CRBS had been off and remains off, the system returns 315. If the CRBS is on, the sequence begins to disable the CRBS and being normal operation. Firstly, the CRBS solenoids are deactivated 319 followed by turn off of the CRBS lamps. While the volumetric pattern in intake and exhaust is returned to normal, there is a pause 323 for several tenths of a second. At the end of the pause, the fuel injection is enabled 325 and normal engine operation resumes.

Engagement of the CRBS may be done manually using lower set point values for the preselected comparison values.

As an additional safety factor, a "dead man switch" or button nay is used, and, CRBS may be automatically engaged in response to that control system.

The systems disclosed have been described as functioning independently of each other to prevent overspeed. As a result, downshift inhibition and/or lockup clutch disengagement may be applied as a separate or unified system to the drivetrain independent of any motor control functions and by sensing only clutch and transmission component operating values. Engine CRBS operates on the engine regardless of clutch and transmission controls.

An integrated system applying all three systems is contemplated and may be integrated through a single computer system. As an additional advantage of such integration, a warning system of lights and buzzers nay be standardized inside the cab to provide advance warning to the operator. The events may be logged by the computer in histogram bins correlated to the values reported. Such logging may be valuable in compiling a service record and estimating time to the next major service.

An additional protection may be used to protect variable displacement hydraulic pumps, especially swash-plate type pumps. Pumps of this type are RPM sensitive and the main shaft typically driven either directly from the engine or at some function of the engine speed (i.e., an engine RPM value). The angle of the swash plate typically is controlled by a solenoid. Alternative methods which are a function of engine RPM are also contemplated, depending upon the method of activation of the swash plate control.

Industrial Applicability

The torque converter RPM sender 101 provides a continuous signal indicating output speed. When an down-shift request is made, the control module interrogates the RPM sender 101, the brake accumulator pressure signal 111, the ground speed sensor 109 and the gearchange requested. Low brake pressure is the override or default condition and allows downshift to proceed. If brake pressure is sufficient, ground speed is interrogated to determine if it is less than a predetermined threshold. If yes, the shift is allowed. The threshold is set at a low speed, essentially equal to stopped and the selection allows a downshift to any gear from a stop. If brake pressure is sufficient and speed is in excess of the threshold, the selected gear is queried. If the selected gear is the lowest gear, the shift is allowed; if not, the shift is denied subject to a query of the torque converter output speed. If the speed is above a preselected rate, the shift request is denied. If less than the preselected rate, the shift request is acknowledged.

The sequence of events described above protects against overspeed damage due to improper gear selection while making allowance for low speed maneuvering and for emergency speed retardation in the event of loss of brake pressure.

When the torque converter output speed exceeds a preselected value in a gear, the electronics control unit (ECU) 203 interrogates whether the torque converter lockup clutch is in operation. If yes, the control unit makes a second inquiry to determine if the output speed exceeds a second, higher value. If yes, the torque converter lockup clutch is disengaged and direct mechanical connection through the transmission ceases. If the second threshold is not met, no response occurs. When the speeds decrement to below the preselected first and second thresholds, the lockup is re-engaged according to the standard protocol for lockup engagement. The disengagement of the lockup clutch provides a cushion against overspeed through backloading and allows the operator to take other action to avoid damage to the engine and ancillaries.

The engagement of the CRBS as a function of engine RPM serves to prevent engine overspeed from any cause but especially in "runaway" situations. After determining if the CRBS is off or on, the engine RPM is interrogated at decision block 305 or 307 of the engine control unit to determine whether the RPM is above or below a preselected threshold, which may vary depending upon whether the CRBS is in manual or automatic mode. If the preselected RPM has been exceeded, an initiation procedure is commenced to shut off fuel at 309 and activate the CRBS solenoids 311 the activation is indicated by a lamp 313 in the cabin. If the RPM is below the preselected RPM, the CRBS is disengaged if on, otherwise the ECU returns to the beginning of its cycle. Severe damage to the structure of the vehicle and the internal mechanical components is avoided in this manner.

The engine RPM output value may be used to ramp down or destroke variable rate hydraulic pumps by increasing the total solenoid current as a function of engine speed, either by a lockup table or a mathematical model calculation.

Other apsects, objects and advantages of this invention can be obtained from a study of the drawings, the disclosure and the appended claims.

What is claimed is:

1. A method to prevent overspeed of an engine of a work machine having a ground-engaging device and a transmission connecting the ground-engaging device to the engine, the method comprising:

producing an operator transmission command signal responsive to at least one of an operator transmission command and an automatic transmission command;

producing a ground speed signal responsive to a ground speed of the work machine;

producing a transmission output speed signal responsive to an output speed of the transmission;

producing a brake status signal;

producing an engine speed signal responsive to an operating speed of the engine;

receiving the operator transmission command signal, the ground speed signal, the transmission output speed signal, the brake status signal, and the engine speed signal; and producing a transmission control signal responsive to the transmission output speed signal and at least one of the operator transmission command signal, the ground speed signal, the brake status signal, and the engine speed signal.

2. The method of claim 1, wherein the brake status signal is produced responsive to at least one of a brake accumulator pressure and a compression release braking system status.

3. The method of claim 1, including:

allowing the operator transmission command to be carried out responsive to the transmission control signal.

4. The method of claim 1, including:

denying the operator transmission command responsive to the transmission control signal.

5. The method of claim 4, including:

notifying an operator that the operator transmission command is denied.

6. The method of claim 4, including:

repeating the method;

monitoring the transmission control signal as the method is repeated at least once; and allowing the operator transmission command responsive to the transmission control signal.

7. The method of claim 1, including:

providing an exception range;

receiving the transmission control signal and producing a transmission allowed signal responsive to the transmission control signal falling within the exception range; and allowing the operator transmission command responsive to the transmission allowed signal.

8. The method of claim 1, including:

providing a compression release engine braking system;

controlling actuation of the compression release engine braking system responsive to the transmission control signal.

9. The method of claim 1, including:

providing a variable capacity hydraulic pump associated with the engine;

destroking the variable capacity hydraulic pump responsive to the transmission control signal.

10. The method of claim 1, including:

recording at least one of the transmission control signal, the operator transmission command signal, the ground speed signal, the transmission output speed signal, the brake status signal, and the engine speed signal in an overspeed log.

11. The method of claim 1, including:

providing a torque converter;

producing a torque converter output speed signal responsive to an output speed of the torque converter;

receiving the operator transmission command signal, the torque converter output speed signal, the ground speed signal, the transmission output speed signal, the brake status signal, and the engine speed signal; and producing a transmission control signal responsive to at least two of the operator transmission command signal, the torque converter output speed signal, the ground speed signal, the transmission output speed signal, the brake status signal, and the engine speed signal.

12. The method of claim 11, including:

providing a lockup clutch associated with the torque converter; and controlling actuation of the lockup clutch responsive to the transmission control signal.

13. A work machine, comprising:

at least one ground-engaging device adapted to provide motive power to the work machine;

an engine;

a transmission adapted to link the ground-engaging device and the engine; and an overspeed prevention system including:

an operator transmission control device adapted to provide an operator transmission command;

a ground speed sensor adapted to produce a ground speed signal responsive to a ground speed of the work machine;

a transmission output sensor adapted to produce a transmission output speed signal responsive to an output speed of the transmission;

a brake sensor adapted to produce a brake signal responsive to at least one of a brake accumulator pressure and a compression release braking system status;

an engine speed sensor adapted to produce an engine speed signal responsive to an operating speed of the engine; and an electronic control module adapted to receive at least two of the operator transmission command signal, the ground speed signal, the transmission output speed signal, the brake status signal, and the engine speed signal, and responsively produce a transmission control signal.

14. The work machine of claim 13, wherein the transmission control signal allows the operator transmission command to be carried out.

15. The work machine of claim 13, wherein the transmission control signal denies the operator transmission command.

16. The work machine of claim 15, wherein a transmission denial warning device is activated responsive to the denial of the operator transmission command and communicates to an operator that the operator transmission command has been denied.

17. The work machine of claim 15, wherein the transmission control signal is produced again and the operator transmission command is automatically carried out responsive to an acceptable transmission control signal.

18. The work machine of claim 12, including a compression release engine braking system associated with the engine and wherein an actuation of the compression release engine braking system is controlled responsive to the transmission control signal.

19. The work machine of claim 13, including a torque converter associated with the transmission and a lockup clutch associated with the torque converter, wherein a torque converter output speed sensor produces a torque converter output speed signal responsive to an output speed of the torque converter, the electronic control module receives at least two of the operator transmission command signal, the torque converter output speed signal, the ground speed signal, the transmission output speed signal, the brake status signal, and the engine speed signal and responsively produces the transmission control signal, and an actuation of the lockup clutch is controlled responsive to the transmission control signal.

20. The work machine of claim 13, including a variable capacity hydraulic pump associated with the engine, wherein the variable capacity hydraulic pump is destroked responsive to the transmission control signal.

21. A method to prevent overspeed of an engine of a work machine having a ground-engaging device, a brake system, and a transmission connecting the ground-engaging device to the engine, the method comprising:

producing an operator transmission command signal responsive to at least one of an operator transmission command and an automatic transmission command;

producing a ground speed signal responsive to a ground speed of the work machine;

producing a transmission output speed signal responsive to an output speed of the transmission;

producing a brake status signal responsive to a hydraulic pressure of the brake system;

producing an engine speed signal responsive to an operating speed of the engine;

receiving the operator transmission command signal, the ground speed signal, the transmission output speed signal, the brake status signal, and the engine speed signal; and producing a transmission control signal responsive to at least two of the operator transmission command signal, the ground speed signal, the transmission output speed signal, the brake status signal, and the engine speed signal.

* * * * *